United States Patent [19]

Warner

[11] Patent Number: 4,473,800

[45] Date of Patent: Sep. 25, 1984

[54] METHOD FOR DETECTING MAGNETOTELLURIC SUBSURFACE ANOMALIES

[75] Inventor: Barry N. Warner, Duncanville, Tex.

[73] Assignee: Mobil Oil Corporation, New York, N.Y.

[21] Appl. No.: 420,673

[22] Filed: Sep. 21, 1982

Related U.S. Application Data

[62] Division of Ser. No. 206,920, Nov. 14, 1980, Pat. No. 4,392,109.

[51] Int. Cl.$^3$ .......................... G01V 3/08; G01V 3/38
[52] U.S. Cl. ...................................... 324/349; 324/350
[58] Field of Search ....................... 324/323, 347–350, 324/357, 366

[56] References Cited

U.S. PATENT DOCUMENTS

| | | | |
|---|---|---|---|
| 2,034,447 | 3/1936 | Schlumberger | 324/349 |
| 2,140,798 | 12/1938 | Jakosky | 324/347 |
| 2,284,990 | 6/1942 | Schlumberger | 324/349 |
| 2,586,667 | 2/1952 | Kunetz | 324/349 |
| 3,188,559 | 6/1965 | Yungul | 324/349 |
| 3,309,607 | 3/1967 | Yungul | 324/349 |
| 3,496,768 | 2/1970 | Boucher | 324/348 |
| 3,778,701 | 12/1973 | Runge | 324/366 |

Primary Examiner—Gerard R. Strecker
Attorney, Agent, or Firm—A. J. McKillop; M. G. Gilman; F. J. Kowalski

[57] ABSTRACT

A method for removing the effects of said subsurface anomalies in magnetotelluric survey data is disclosed wherein resistivity curves are compared and a correction factor is determined. Resistivity curves having a deviation from a mean are multiplied by this correction factor.

4 Claims, 8 Drawing Figures

METHOD FOR DETECTING MAGNETOTELLURIC SUBSURFACE ANOMALIES

This is a division of application Ser. No. 206,920 filed Nov. 14, 1980, now U.S. Pat. No. 4,392,109.

BACKGROUND OF THE INVENTION

The present invention pertains to a method for processing magnetotelluric survey data and more particularly to a method for removing the effects of near surface anomalies on resistivity curves produced through magnetotelluric surveys.

Several tools for geological exploration research of the earth's subsurface formations exist in present technology. Although the most widely accepted tool is seismic surveying, other tools such as magnetotelluric surveys may be used in certain instances. The magnetotelluric survey is usually less expensive than a seismic survey. However, in general, a magnetotelluric survey is not as accurate nor does it possess as high a degree of resolution as a seismic survey.

A method for taking magnetotelluric measurements is to place four electrodes in a pattern defining a square with each electrode in a corner. Of the four electrodes, opposite corners of the square are paired, thus the lines defined by connecting paired electrodes are perpendicular to each other. Electrical impulses are received from natural electrical energy in the earth from one electrode to the other electrode of the pair. For complete magnetotelluric survey information magnetometer coils are needed to measure the magnetic effects of the earth at the location being surveyed. The electrode pairs give the E components of the survey, normally designated as $E_x$ and $E_y$. The E measurements are correlated with H measurements ($H_x$ and $H_y$) which are detected by the magnetometer coils. The frequency of the electrical waves indicates the depth of the formation for which the resistance is measured. For example, the resistance of a shallow subsurface formation can be measured by detecting high frequency telluric electromagnetic waves. To obtain the resistance of deeper formations, lower frequencies of the telluric electromagnetic waves are measured. The depth of the formation having the measured resistivity is calculated by combining the telluric electrical field and the magnetic field measured. Resolution of the exact point for which the resistivity is being measured at a given depth deteriorates as a greater depth is surveyed. For a more detailed discussion of magnetotelluric surveying and electrode placement techniques, reference is made to U.S. Pat. No. 4,286,218, titled "Multiple Site Magnetotelluric Measurements" filed by Marvin G. Bloomquist, et al, assigned to the same assignee as the present application.

In a magnetotelluric survey, the resistivity of the subsurface formations beneath the measuring device is frequently the information displayed. This information may be plotted illustrating resistivity as a function of frequency such as the graphical representation of FIG. 1. As illustrated in FIG. 1A, by convention two separate resistivity curves ($R_x$ and $R_y$) are routinely generated during the processing of magnetotelluric data. These two curves are assumed to be "parallel to electrical strike" and "perpendicular to electrical strike" respectively. From the two curves labelled $R_x$ and $R_y$, approximate true resistivity versus depth curves are calculated in an attempt to generate a highly smooth resistivity distribution of the subsurface. However, due to surface or near surface anomalies, the $R_x$ and $R_y$ curves will separate or split into $R'_x$ and $R'_y$ curves and be parallel to each other. Thus a DC like bias is present in the data and illustrated in FIG. 1B. This DC bias is normally attributed to localized surface anomalies such as "pipelines, geological faults, lithology variations, small caverns", etc. A subsurface formation which dips will produce different readings depending on the relationship between the configuration of the measuring electrode pair and the angle of the formation dip.

SUMMARY OF THE INVENTION

The present invention removes the effects of undesirable subsurface anomalies present in magnetotelluric data by establishing a correction factor to normalize the resistivity curves obtained from each site. A portion of each resistivity curve is averaged to establish mean value and variance limit. All resistivity curves which are outside the variance limits are multiplied by a ratio established by the mean value and the portion averaged for that resistivity curve.

DESCRIPTION OF THE PREFERRED EMBODIMENT

Figure 1A:
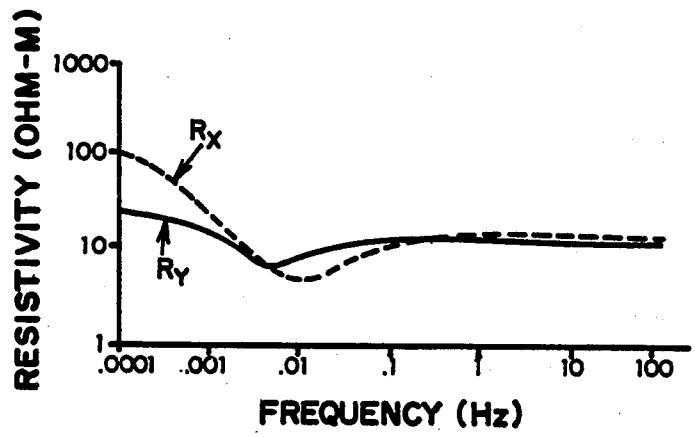
FIGS. 1A and 1B are graphical representations of $R_x$, $R_y$ and $R'_x$, $R'_y$ components of resistivity curves.
Figure 1B:
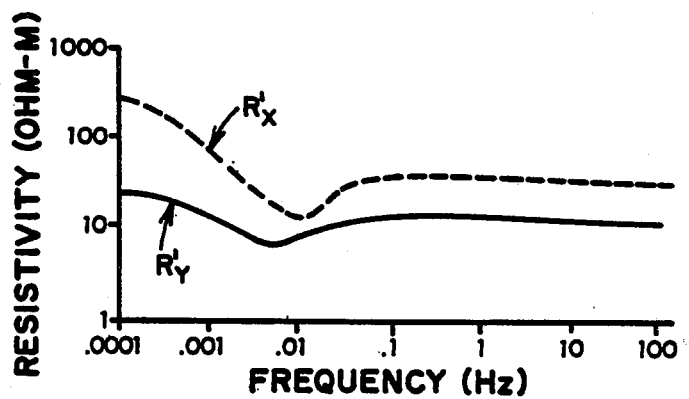

As previously stated in conjuction with FIGS. 1A and 1B, resistivity curves $R'_x$ (resistivity parallel to strike) and $R'_y$ (resistivity perpendicular to strike) of FIG. 1B may split due to the effects of subsurface anomalies which are unrelated to natural formations, such as pipelines, or small natural formations, such as small caverns, biasing the entire resistivity of the curve. Curves $R_x$ and $R_y$ of FIG. 1A may partially track and partially split due to deep subsurface anomalies such as formation dips, etc.

Figure 2:
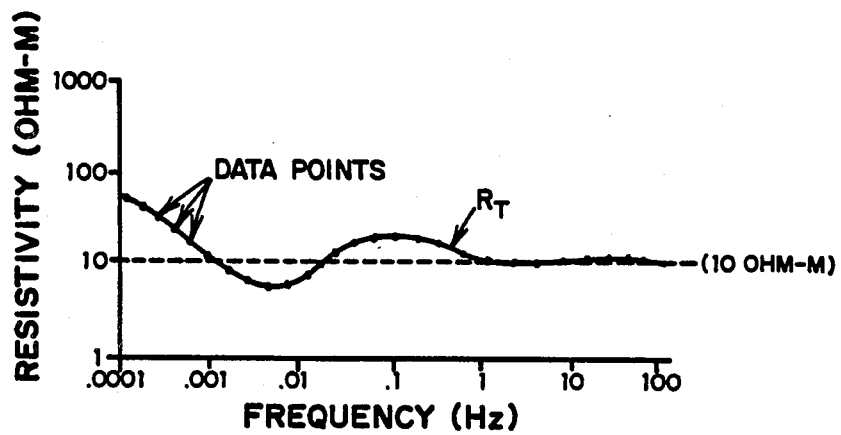
FIG. 2 is a graphical representation of a resistivity curve.

Referring now to FIG. 2, a graphical representation of a resistivity curve $R_t$, drawn through a series of data points, having a frequency as the abscissa and resistance as the ordinate is illustrated. $R_t$ is a resistivity curve typical of those obtained from a combination of $R_x$ and $R_y$. At the higher frequencies of approximately 1 to 100 hertz, the resistivity curve is almost constant. The frequency range from approximately 0.01 hertz to 0.1 hertz, a subsurface formation with increased resistivity exists. Below a frequency of approximately 0.001 hertz the resistivity of the formation increases steadily to a value of approximately 70 ohms. Resistivity curve $R_t$ is similar to those obtained for each site in a magnetotelluric survey with the frequency axis having a relationship to a more meaningful parameter such as depth.

Figure 3:
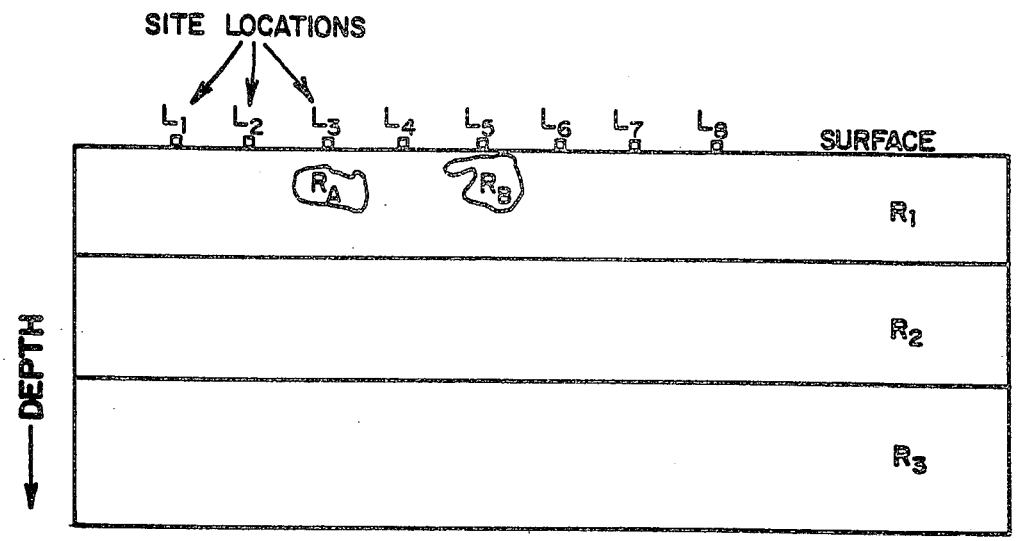
FIG. 3 is a vertical cut-away representation of a section of the earth's subsurface.

Referring now to FIG. 3, a cross section of a typical vertical section of earth is illustrated having 3 levels of resistance, $R_1$ as the resistance closest to the surface followed by $R_2$ and the deepest formation $R_3$. Magnetotelluric sites $L_1$ through $L_8$ are indicated across the surface. Beneath site $L_3$ and site $L_5$, resistive anomalies $R_a$ and $R_b$ exist. For the purposes of example, we will assume that $R_a$ is a highly resistive anomaly and $R_b$ is a less resistive or more conductive anomaly.

Figure 4A:
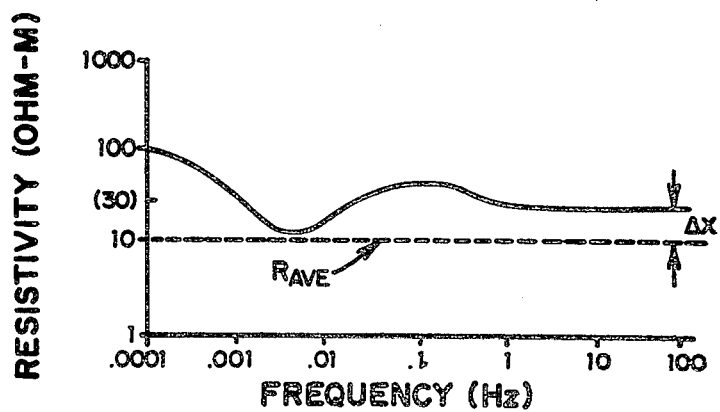
FIGS. 4A, 4B, are graphical representations of resistivity curves.
Figure 4B:
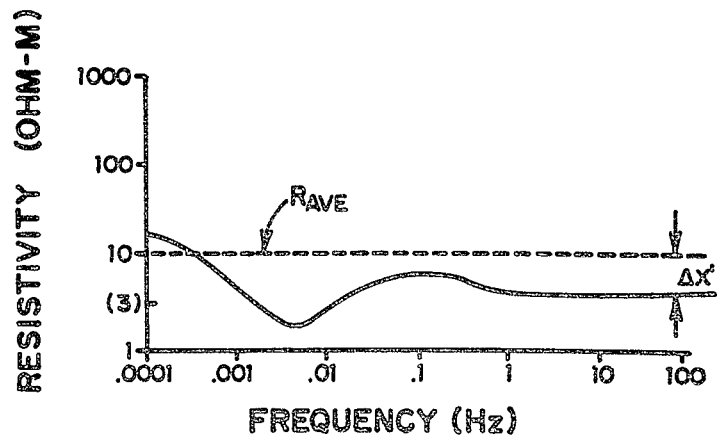

FIGS. 4A and 4B represent the resistivity curves for the $R'_x$ component of the field data. A similar, although not identical, set of figures can be drawn for the $R'_y$ component.

FIG. 4A illustrates a resistivity curve such as that which would be encountered at site $L_3$. The increased resistivity of $R_a$ has displaced the total resistivity or true resistivity of the subsurface formations by a small increment $\Delta x$.

FIG. 4B illustrates a resistivity curve typical of what would be encountered at site $L_5$. The resistivity curve is displaced downward or in a less conductive direction by a small increment $\Delta x'$. In both FIG. 4A and FIG. 4B the normal or expected average resistance is indicated by dashed line $R_{ave}$.

Figure 5:
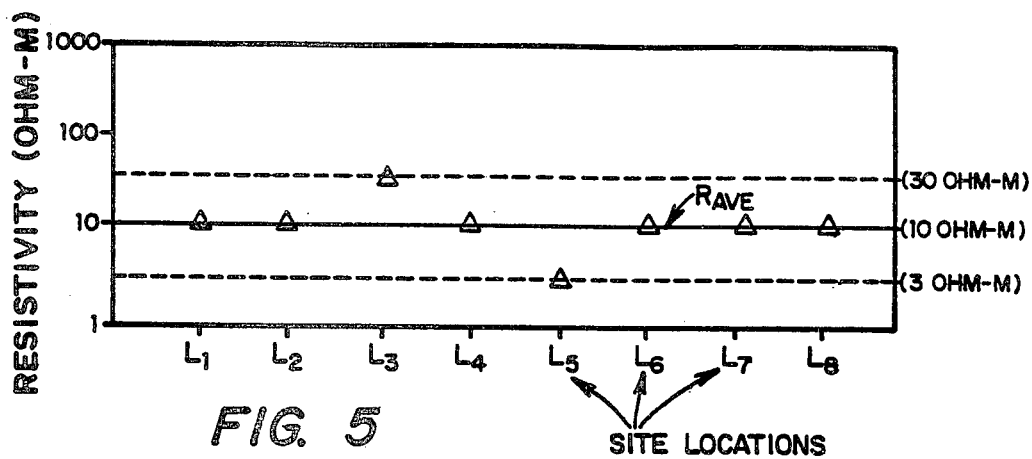
FIG. 5 is a graphical representation of portion averages for typical resistivity curves.

Referring now to FIG. 5, the graphical representation of the average values of resistance for a portion of the resistivity curves for sites $L_1$ through $L_8$ is illustrated. Line $R_{ave}$ represents the mean resistance for sites $L_1$ through $L_8$. The average values for sites $L_3$ and $L_5$ have been displaced from $R_{ave}$ by the resistance anomalies $R_a$ and $R_b$ immediately below the site location. For purposes of example, line $R_{ave}$ is shown as a straight line with a resistivity value of 10 ohm-meters at each site $L_1$ through $L_8$. Line $R_{ave}$, under various geologic conditions, may be a curved line.

In actual practice, the distance between sites on a magnetotelluric survey can vary anywhere from hundreds of feet to several miles. Based on the information from neighboring sites, discrepencies in average values for resistivity curves taken at each site may be determined. However, mere discrepency alone does not indicate that the recorded data has been effected by some subsurface anomaly but may indicate a region having a resistance inconsistent with expected data. To determine whether a subsurface anomaly is present, the individual curves which comprise the true or total resistivity of a site are compared. If $R_x$ is displaced from $R_y$ through their entire distance (see FIG. 1A) a near surface anomaly is indicated. As indicated previously, prior art teaches no solution to the erroneous data.

Figure 6:
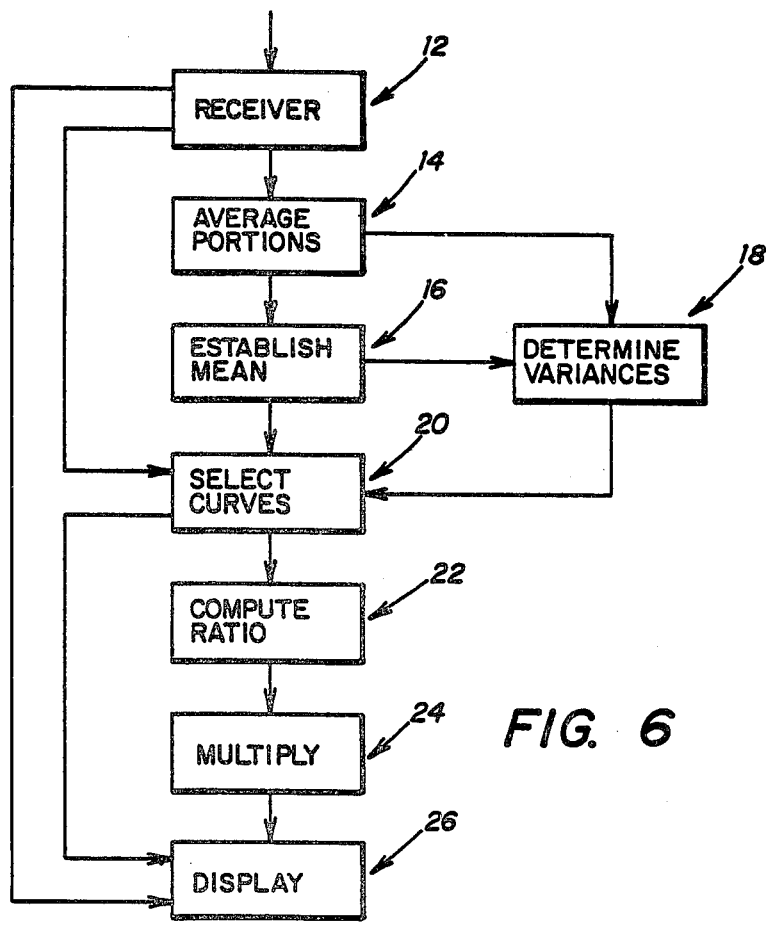
FIG. 6 is a flow chart of the method of the present invention.

Referring now to FIG. 6, a flow chart of the method of the present invention is illustrated. Data is received by receiver 12 which may be of any type receiver presently known in the art. Receiver 12 feeds the information to averager 14 which selects portions of the resistivity curves for each site and computes an average value for each of the resistivity curves. The calculated averages from averager 14 are fed to establisher 16 and determiner 18. Establisher 16 established a mean value for the averages of all resistivity curves. Determiner 18 determines the permissible variance limits of the resistivity curve averages. Both establisher 16 and determiner 18 may be programmable read only memories (PROM) such as those presently available in the art. Both establisher 16 and determiner 18 feed the information to selector 20 which determines the resistivity curves that are to be normalized. Selector 20 compares the individual resistivity curves with the mean value and selects those which are outside of the established variance. Selector 20 feeds this information to ratio computer 22 which computes a ratio of the mean value and the portion averaged for each of the selected curves. This ratio is fed to multiplier 24 which normalizes the selected curves by multiplying every point on each curve by the computed ratio for that particular resistivity curve. Each of the 8 resistivity curves may then be displayed by display 26 which may be of any type currently used in the art such as cathode ray tube, printer, etc.

Averager 14 selects only a portion of each resistivity curve fed through receiver 12 to establish a base for the ratio calculated by computer 22. Only a portion of the curve is required since if subsurface anomaly biasing is present, a single point gives the extent of the biasing. Several points or a small portion of the curve is averaged to lessen the effect of noise which may be present in any one point.

Establisher 16 determines a mean value for the portion averager from averager 14. A mean value is preferred, although a second average of the portion averages may be computed. An average of the portion averages is ideally the same as a mean value of the portion averages assuming that for any given magnetotelluric survey the distribution between less conductive and more conductive effects is equal. A greater number of conductive anomalies, or a greater number of resistive anomalies will cause a significant difference between the value of the average of the portion averages in comparison to the mean average. Determiner 18 establishes variance limits which determine the resistivity curves to be selected.

Selector 20 receives a mean average from establisher 16 and the variance limits from determiner 18 and also receives the portion averages of the resistivity curves from averager 14. Selector 20 compares each of the portion averages from averager 14 with the mean average from establisher 16. Any of the resistivity curves which have a portion average exceeding the variance limits established by determiner 18 are fed to computer 22 and multiplier 24. Computer 22 takes the mean average value and multiplies it by the portion average calculated for each resistivity curve by averager 14. Thus, for example, for the resistivity curve illustrated in FIG. 4A, if the portion which was averaged is between 1 and 10 cycles, a value of approximately 30 ohms is obtained. Mean average as indicated by dashed line $R_{ave}$ is 10 ohms. The curve of FIG. 4A would be multiplied by a ratio of 10/30 which would place the curve down to a value as that illustrated by $R_t$ in FIG. 2. The curve of FIG. 4B having a resistivity value of 3 ohms or the average between 1 and 10 cycles would be multiplied by a ratio of 10/3 which would move FIG. 5 also to a position as that of curve $R_t$ of FIG. 2. Therefore, a ratio is calculated by computer 22 to adjust each resistivity curve to produce a consistent set of resistivity curves having the effects of subsurface anomalies removed. Selector 20, which may be a programmable read only memory, may be programmed to not select certain curves. Resistivity curves which have resistivity average outside the variance limits due to unrealistic changes in formation resistance and not subsurface anomalies are not to be normalized for the calculation of $R_{ave}$. These curves may be preselected to bypass computer 22. The determination of which curves are to be normalized may be done in accordance with the procedure described in conjunction with FIGS. 1A and 1B. Multiplier 24 receives the ratio from computer 22 and also receives resistivity curves selected by selector 20. Each of the resistivity curves from selector 20 is multiplied by its corresponding ratio from computer 22. Multiplier 24 multiplies each point of data on the resistivity curves received from selector 20 by the ratio computed by computer 22. This information is then fed to display 26 which, as previously pointed out, may be of any type of display presently used in the art.

The foregoing description of the preferred embodiment has been given by way of flow chart and indications as to the type of components which may be used for each step. However, the method of the present invention operates particularly well on a presently used digital computer and has been intended for such use.

The present invention teaches a method which may be used to remove the effects of subsurface anomalies, such as, pipelines, railroad tracks, small caverns, etc. Through the use of the present invention, moe accurate information may be obtained from the use of magnetotelluric surveys to increase their reliability and acceptance.

The present invention has been described by way of a preferred embodiment for illustration only and should not be limited thereto but only by the scope of the following claims.

What is claimed is:

1. A method for detecting subsurface anomalies in vertical magnetotelluric surveys where a first pair and a second pair of electrodes in a perpendicular pattern at a single location are used to collect data where resistivity is plotted as a function of frequency and frequency may be correlated to depth, said method comprising the steps of:

receiving a first set of data consisting of resistivity points as a function of frequency from the first pair of electrodes at a first location:
receiving a second set of data consisting of resistivity points as a function of frequency from the second pair of electrodes at said first location;
computing a difference between said first set of data and said second set of data to produce a difference set consisting of resistivity points as a function of frequency;
displaying said difference set as a graphical plot; and;
identifying a first subsurface anomaly whenever said plot of said difference set exceeds a predetermined amount and produces a DC like bias shifting said plot of said difference set.

2. The method according to claim 1 also including the step of:
determining the depth of said first subsurface anomaly by correlating the frequency of the occurrence of said bias with depth.

3. The method according to claim 1 wherein said identifying step includes the step of:
identifying a second subsurface anomaly whenever said plot of said difference set produces a second DC like bias shifting said plot of said difference set.

4. The method according to claim 3 also including the step of:
determining the depth of said first subsurface anomaly and said second subsurface anomaly by correlating the frequency of the occurrence of said bias with depth.

* * * * *